United States Patent
Im et al.

(10) Patent No.: US 9,533,593 B2
(45) Date of Patent: Jan. 3, 2017

(54) CHARGER FOR ELECTRIC VEHICLE

(71) Applicant: LSIS CO., LTD., Anyang-si, Gyeonggi-do (KR)

(72) Inventors: Chang Jun Im, Asan-si (KR); Seung Woo Choi, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 300 days.

(21) Appl. No.: 14/323,868

(22) Filed: Jul. 3, 2014

(65) Prior Publication Data
US 2015/0015202 A1    Jan. 15, 2015

(30) Foreign Application Priority Data
Jul. 10, 2013   (KR) .................. 10-2013-0080728

(51) Int. Cl.
  *H02J 7/00* (2006.01)
  *H02J 7/14* (2006.01)
  *B60L 11/18* (2006.01)

(52) U.S. Cl.
  CPC .......... *B60L 11/1824* (2013.01); *H02J 7/0047* (2013.01); *B60L 11/1861* (2013.01); *H02J 2007/0049* (2013.01); *H02J 2007/0096* (2013.01); *Y02T 10/7005* (2013.01); *Y02T 10/7072* (2013.01); *Y02T 90/12* (2013.01); *Y02T 90/121* (2013.01); *Y02T 90/14* (2013.01); *Y02T 90/16* (2013.01)

(58) Field of Classification Search
  USPC ............... 320/107, 108, 109, 137, 103, 115, 150, 320/101; 324/432, 430, 431, 433, 434
  See application file for complete search history.

(56) References Cited

U.S. PATENT DOCUMENTS

| 8,725,330 | B2 * | 5/2014 | Failing | .................. B60L 3/00 701/22 |
| 2007/0244610 | A1 * | 10/2007 | Ozick | ..................... A47L 5/30 701/23 |
| 2007/0279002 | A1 * | 12/2007 | Partovi | ............... H02J 7/0027 320/115 |

(Continued)

FOREIGN PATENT DOCUMENTS

| CN | 1250990 | 4/2000 |
| DE | 10-2011-009559 | 8/2012 |

(Continued)

OTHER PUBLICATIONS

The State Intellectual Property Office of the People's Republic of China Application Serial No. 201410409297.7, Office Action dated Dec. 28, 2015, 7 pages.

(Continued)

Primary Examiner — Alexis A Boateng
(74) Attorney, Agent, or Firm — Lee, Hong, Degerman, Kang & Waimey

(57) ABSTRACT

Provided is a charger for an electric vehicle. The charger for an electric vehicle includes a light emitting unit displaying charging operation information of the charger, a communication unit performing near-field wireless communication with an external device, a guide guiding visible light of the light emitting unit, and a control unit controlling operations of the light emitting unit and the communication unit. The guide includes a reflective layer surrounding a portion of the outside of the guide to reflect the visible light toward the inside of the guide.

9 Claims, 3 Drawing Sheets

(56) References Cited

U.S. PATENT DOCUMENTS

| | | | | |
|---|---|---|---|---|
| 2008/0213652 A1* | 9/2008 | Scheucher | ............... | B60L 8/00 |
| | | | | 429/62 |
| 2008/0276407 A1* | 11/2008 | Schnittman | ............ | A47L 11/34 |
| | | | | 15/319 |
| 2009/0021364 A1* | 1/2009 | Frey | ..................... | B60L 3/0069 |
| | | | | 340/468 |
| 2010/0037418 A1* | 2/2010 | Hussey | .................... | A47L 5/30 |
| | | | | 15/319 |
| 2011/0050179 A1* | 3/2011 | Mitani | ............... | F02N 11/0825 |
| | | | | 320/150 |
| 2012/0126747 A1* | 5/2012 | Kiko | .................... | B60L 3/0069 |
| | | | | 320/109 |
| 2012/0129378 A1* | 5/2012 | Kiko | ................... | H01R 13/717 |
| | | | | 439/345 |
| 2013/0021162 A1* | 1/2013 | DeBoer | .............. | B60L 11/1824 |
| | | | | 340/635 |
| 2013/0078839 A1* | 3/2013 | Musk | ................. | B60L 11/1818 |
| | | | | 439/345 |

FOREIGN PATENT DOCUMENTS

| | | |
|---|---|---|
| EP | 2548758 | 1/2013 |
| JP | 2008072859 | 3/2008 |
| JP | 2010-213465 | 9/2010 |
| JP | 2011-015529 | 1/2011 |
| JP | 3169528 | 7/2011 |

OTHER PUBLICATIONS

Japan Patent Office Application Serial No. 2014-141155, Office Action dated Oct. 20, 2015, 3 pages.
European Patent Office Application Serial No. 14176041.3, Search Report dated Oct. 20, 2015, 4 pages.

* cited by examiner

CHARGER FOR ELECTRIC VEHICLE

CROSS-REFERENCE TO RELATED APPLICATIONS

Pursuant to 35 U.S.C. §119(a), this application claims the benefit of earlier filing date and right of priority to Korean Patent Application No. 10-2013-0080728, filed on Jul. 10, 2013, the contents of which are all hereby incorporated by reference herein in its entirety.

BACKGROUND

Electric vehicles mean vehicles driven by using electricity. Electric vehicles may be largely classified into battery powered electric vehicles and hybrid electric vehicles.

Here, the battery powered electric vehicles mean vehicles driven by using only electricity. Thus, such a battery powered electric vehicle may be called a general electric vehicle. Also, the hybrid electric vehicles mean vehicles driven by using electricity and fossil fuel. Such a hybrid electric vehicle includes a battery supplying electricity for driving. Particularly, in a case of the battery power electric vehicle and a plug-in type hybrid electric vehicle of the hybrid electric vehicle, a battery is charged by current supplied from an external power source to drive an electric motor.

In a case of a codeset type charger for charging the electric vehicle, the electric vehicle may be charged by using commercial electricity. For this, the codeset type charger may be connected to a socket provided in households or offices and the electric vehicle to supply a power to the electric vehicle.

The charger according to the related art includes only a display unit for displaying a charged state when the battery is charged. Thus, when the charger is broken down, it may be difficult to diagnose the cause of the defect or update a firmware.

These limitations may be solved when a port that is capable of connecting a diagnostic device or a device for upgrading the firmware is connected to the charger. In the case of the charger, the charger has to obligatorily secure waterproof performance. However, if a separate port is provided in the charger, an additional unit for securing the waterproof performance is needed.

Also, since a port for communicating is separately provided, a malicious user may change or damage internal program of the charger.

SUMMARY

Embodiments provide a charger for an electric vehicle.

Embodiments also provide a charger for an electric vehicle, which is capable of communicating with an external device without providing an additional unit for securing waterproof performance.

Also, a communication unit for performing near-field wireless communication with an external device may be efficiently provided to maximize space application and improve communication performance.

In one embodiment, a charger for an electric vehicle includes: a light emitting unit displaying charging operation information of the charger; a communication unit performing near-field wireless communication with an external device; a guide guiding visible light of the light emitting unit; and a control unit controlling operations of the light emitting unit and the communication unit, wherein the guide includes a reflective layer surrounding a portion of the outside of the guide to reflect the visible light toward the inside of the guide.

The communication unit may include a transmitting device for transmitting electromagnetic waves for the near-field wireless communication and a receiving device for receiving the electromagnetic waves for the near-field wireless communication, and the guide may guide the electromagnetic waves for the near-field wireless communication, which is emitted from the transmitting device or received into the receiving device.

The guide may include: a first guide part extends vertically, the first guide part having a lower end that is disposed above the transmitting device or the receiving device; a connection part inclinedly extending upward from an upper end of the first guide part; and a second guide part extending upward from the connection part, the second guide part disposed above the light emitting unit.

The guide may include: a first light entrance provided in a lower portion of the first guide part; a second light entrance provided in a lower portion of the second guide part; and a third light entrance provided in an upper portion of the second guide part, wherein the reflective layer may not be provided on at least one of the first light entrance, the second light entrance, and the third light entrance.

The electromagnetic waves for the near-field wireless communication may be incident from the transmitting device through the first light entrance, or the visible light may be irradiated onto the receiving device through the first light entrance, the visible light irradiated from the light emitting unit may be incident through the second light entrance, and the electromagnetic waves for the near-field wireless communication, which is transmitted from the transmitting device, or the visible light emitted from the light emitting unit may be emitted through the third light entrance, or infrared light irradiated from the outside may be incident through the third light entrance.

The guide may further include a third guide part extending from one of the first guide part, the connection part, and the second guide part toward the light emitting unit.

The extension direction of the first guide part may be the same as that of the third guide part.

A first light entrance through which the electromagnetic waves for the near-field wireless communication is incident from the transmitting device or irradiated onto the receiving device may be provided in a lower portion of the first guide part, a second light entrance through which the visible light irradiated from the light emitting unit is incident may be provided in a lower portion of the third guide part, a third light entrance through which the electromagnetic waves for the near-field wireless communication, which is transmitted from the transmitting device, or the visible light emitted from the light emitting unit is emitted, or infrared light irradiated from the outside is incident may be provided in an upper portion of the second guide part, and the reflective layer may not be provided on at least one of the first, second, and third light entrances.

The electromagnetic waves may include infrared light.

The first and second guide part may extend to be offset from each other.

The guide may include: a first guide guiding electromagnetic waves transmitted from the transmitting device; and a second guide guiding the electromagnetic waves received into the receiving device, wherein a connection part of the first guide and a connection part of the second guide may be away from each other in an upward direction.

The light emitting unit may include a first light emitting part and a second light emitting part, which are spaced apart from each other, and the transmitting device and the receiving device may be disposed between the first light emitting part and the second light emitting part.

The details of one or more embodiments are set forth in the accompanying drawings and the description below. Other features will be apparent from the description and drawings, and from the claims.

DETAILED DESCRIPTION OF THE EMBODIMENTS

Hereinafter, a charger for an electric vehicle according to an embodiment will be described in detail with reference to accompanying drawings.

Figure 1:
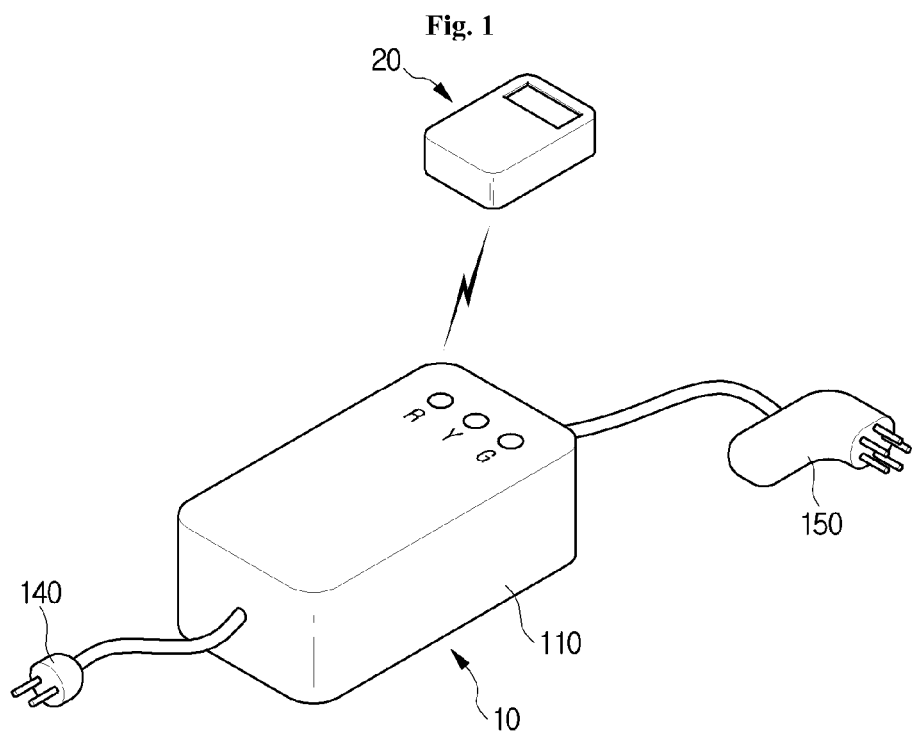
FIG. 1 is a perspective view of a charger for an electric vehicle according to an embodiment.
Figure 2:
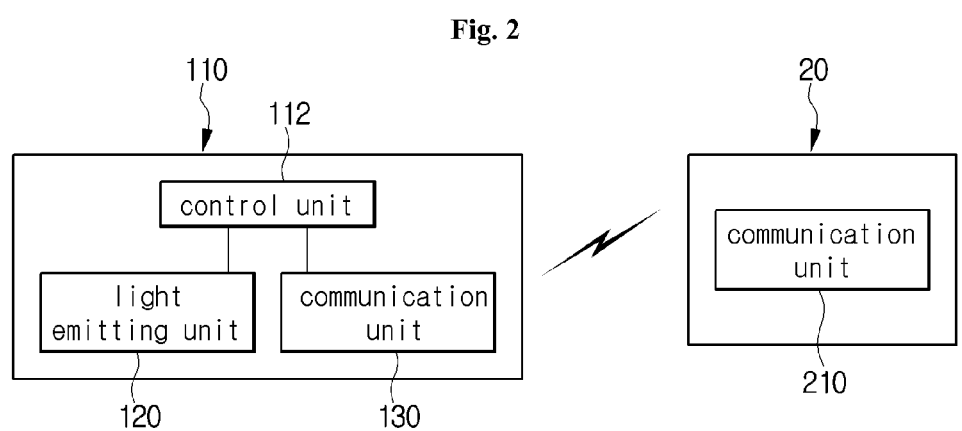
FIG. 2 is a block diagram of the charger for the electric vehicle according to an embodiment.

FIG. 1 is a perspective view of a charger for an electric vehicle according to an embodiment, and FIG. 2 is a block diagram of the charger for the electric vehicle according to an embodiment.

Referring to FIGS. 1 and 2, a charger 10 for an electric vehicle (hereinafter, referred to as a "charger") according to an embodiment may be a codeset type charger.

The charger 10 may include a charger body 110, a first connector 140 connected to the charger body 110 and a commercial power source, and a second connector 150 connected to the charger body 110 and the electric vehicle.

When the first connector 140 is connected to the commercial power source, and the second connector 150 is connected to the electric vehicle, current supplied from the commercial power source is transmitted into a battery of the electric vehicle through the charger 10.

The charger body 110 includes a light emitting unit 120, a communication unit 130, and a control unit 112. The control unit 112 controls operations of the light emitting unit 120 and the communication unit 130.

The light emitting unit 120 may display an operation of the charger 10, i.e., information with respect to a charging operation. For example, the light emitting unit 120 may include a plurality of light emitting diodes (LEDs) that emit light having various colors according to the charging operation. Here, light emitted from the LEDs may be visible light.

The communication unit 130 may communicate with a communication unit 210 of an external device 20 such as a diagnostic device for diagnosing the charger 10 or an upgrade device for upgrading a firmware of the charger 10.

The communication units 130 and 210 may communicate with each other, for example, by using light. That is, the communication units 130 and 210 may communicate with each other by using infrared light.

Figure 3:
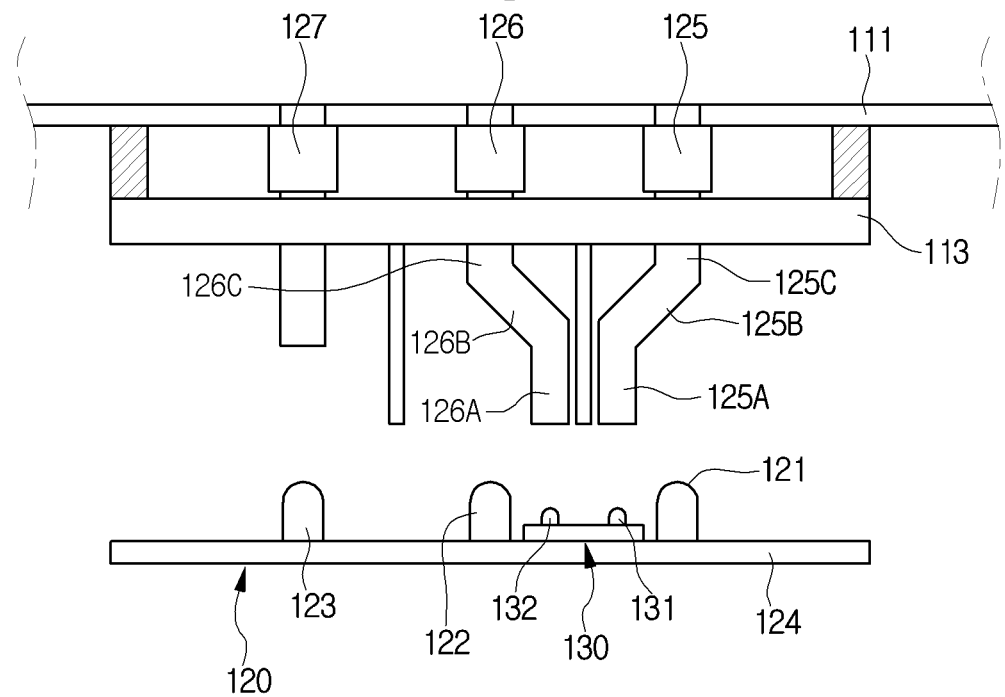
FIG. 3 is a schematic view illustrating an internal configuration of a main body of the charger for the electric vehicle according to an embodiment.

FIG. 3 is a schematic view illustrating an internal configuration of the main body of the charger for the electric vehicle according to an embodiment.

Referring to FIG. 3, the charger body 110 includes a casing 111 defining an exterior thereof, the light emitting unit 120 disposed in the casing 111, and the communication unit 130. Also, the charger body 110 includes a plurality of guides for guiding the visible light.

Explaining components constituting the charger body 110 in more detail, the light emitting unit 120 includes a plurality of LEDs 121, 122, and 123. For example, the light emitting unit may include a first LED 121, a second LED 122, and a third LED 123. The present disclosure is not limited to the number of LEDs constituting the light emitting unit 120. For example, according to the current embodiment, the light emitting unit 120 may include three LEDs.

Each of the LEDs 121, 122, and 123 may be disposed on a printed circuit board (PCB) 124.

For example, while the charging operation is performed, the first LED 121 may be turned on. The first LED 121 may emit visible light having a green color.

When the charging operation is completed, the second LED 122 may be turned on. The second LED 122 may emit visible light having a yellow color.

When the charging operation is stopped, the third LED 123 may be turned on. The third LED 123 may emit visible light having a red color.

In this specification, the light emission color of each of the LEDs 121, 122, and 123 and display information when each of the LEDs 121, 122, and 123 is turned on may be changed.

Here, "the completion of the charging operation" may mean a case in which charging of the battery of the electric vehicle is completed, or a case in which supply of current into the electric vehicle form the commercial power source is completely finished, such as separation of the first and second connector 140 and 150.

Also, "the stop of the charging operation" may mean a case in which the supply of the current into the electric vehicle from the commercial power source is blocked. Substantially, "the completion of the charging operation" may mean the case in which the supply of the current into the electric vehicle from the commercial power source is blocked except for "the stop of the charging operation".

The communication unit 130 may be disposed on the PCB 124 provided in the casing 111. The communication unit 130 may include a transmitting device 131 and a receiving device 132.

The communication unit 130 may be disposed between the LEDs, which are adjacent to each other, of the plurality of LEDs 121, 122, and 123. For example, in FIG. 3, the communication unit 130 is disposed between the first LED 121 and the second LED 122.

The communication unit 130, the first LED 121, and the second LED 122 are spaced apart from each other to prevent light from interfering with each other. That is, when viewed from an upper or lower side, the communication unit 130, the first LED 121, and the second LED 122 may be spaced apart from each other without overlapping with each other.

The guides 125, 126, and 127 may guide moving of the light emitted from the LEDs 121, 122, and 123, i.e., moving of the visible light.

The guides 125, 126, and 127 includes a first guide 125 for guiding the visible light of the first LED 121, a second guide 126 for guiding the visible light of the second LED 122, and a third guide 127 for guiding the visible light of the third LED 123. Each of the guides 125, 126, and 127 may be vertically spaced from each of the LEDs 121, 122, and 123 and fixed to the casing 111 by a support 113.

The first and second guides 125 and 126 may guide electromagnetic waves for near-field wireless communication in addition to the guiding of the visible light emitted from the first and second LEDs 121 and 122.

The near-field wireless communication may include infrared (IrDA) communication, ZigBee communication, Bluetooth communication, wireless LAN communication, ultra wideband (UWB) communication, and the like. In the current embodiment, the IrDA communication will be described as an example of the near-field wireless communication. However, the present disclosure is not limited thereto. For reference, light may be understood as a kind of electromagnetic waves.

When the IrDA communication is used as the near-field wireless communication, electromagnetic waves guided by the guide so as to perform the near-field wireless communication may be infrared light. Light may be a portion of electromagnetic waves in a broad sense, and infrared light may represent light having a specific wavelength.

In the current embodiment, at least two guides respectively corresponding to the transmitting device 131 and the receiving device 132 are required for guiding electromagnetic waves for the near-field wireless communication, i.e., infrared light. Thus, the charger according to the current embodiment may include a plurality of guides. A portion or the whole of the plurality of guides may guide the infrared light.

Particularly, the first and second guides 125 and 126 may be disposed adjacent to each other. Also, the first and second guides 125 and 126 may be horizontally symmetrical to each other.

The first guide 125 may guide electromagnetic waves (infrared light) for the near-field wireless communication, which are generated from the transmitting device 131, to the external device 20, and the second guide 126 may guide the electromagnetic waves (the infrared light) for the near-field wireless communication, which are received from the external device 20, to the receiving device 131.

Referring to FIG. 3, the first guide 125 may include a first guide part 125A extending vertically, a connection part 125B inclinedly extending upward from the first guide part 125A, and a second guide part 125C vertically extending from the connection part 125B. In more detail, the connection part 125B may inclinedly extend upward from an upper end of the first guide part 125A, and the second guide part 125C may extend upward from an upper end of the connection part 125B.

Since the connection part 125B is inclined, the first and second guide parts 125A and 125B may not overlap each other when viewed from an upper or lower side. That is, the extension direction of the first guide part 125A and the extension direction of the second guide part 125C may be offset from each other.

The second guide 126 may include a first guide part 126A extending vertically, a connection part 126B inclinedly extending upward from the first guide part 126A, and a second guide part 126C vertically extending from the connection part 126B. In more detail, the connection part 126B may inclinedly extend upward from an upper end of the first guide part 126A, and the second guide part 126C may extend upward from an upper end of the connection part 126B.

Since the connection part 126B is inclined, portions or the whole of the first and second guide parts 126A and 126B may not vertically overlap each other. That is, the extension direction of the first guide part 126A and the extension direction of the second guide part 126C may be offset with each other.

Here, the connection part 125B of the first guide 125 and the connection part 126B of the second guide 126 may inclinedly extend in a direction away from each other toward an upper side, as illustrated in FIG. 3. Thus, a distance between the first guide part 125A of the first guide 125 and the first guide part 126A of the second guide 126 may be less than that between the second guide part 125C of the first guide 125 and the second guide part 126C of the second guide 126.

In the current embodiment, the vertical direction may be equal to the irradiation direction of the visible light emitted from the LEDs. Thus, the visible light may be irradiated in left and right directions according to a position of the LED.

Figure 4:
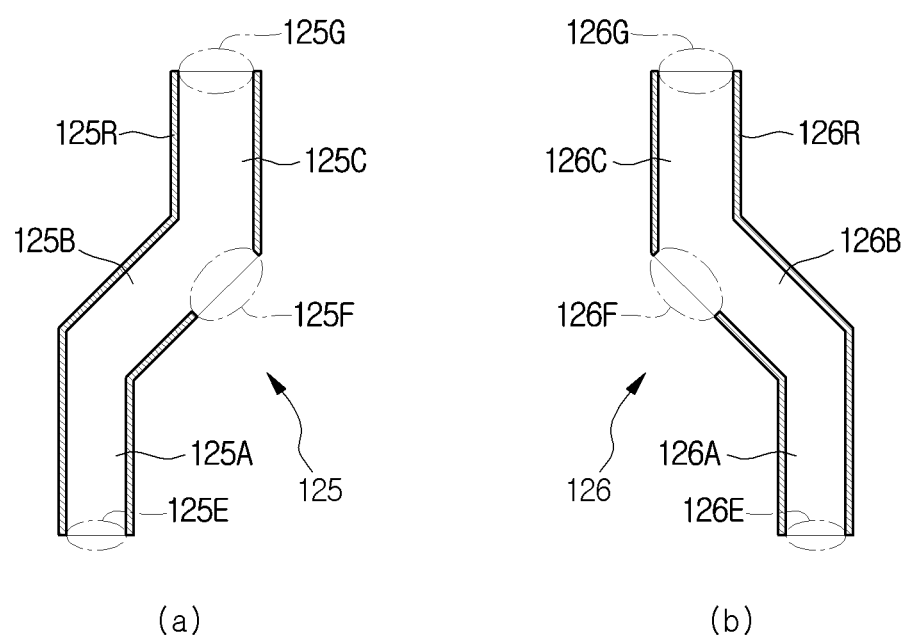
FIG. 4 is a side cross-sectional view of a guide, wherein (a) of FIG. 4 is a side cross-sectional view of a first guide, and (b) of FIG. 4 is a side cross-sectional view of a second guide.

FIG. 4 is a side cross-sectional view of the guide, wherein FIG. 4A is a side cross-sectional view of the first guide 125, and FIG. 4B is a side cross-sectional view of the second guide 126.

Reflective layers 125R and 126R are disposed in the first and second guides 125 and 126, respectively. The reflective layers 125R and 126R may reflect the visible light emitted into the guide parts to the inside of the guide parts. Since the reflective layers 125R and 126R are provided, the largest amount of visible light incident into an end of each of the reflective layers 125R and 126R may be emitted through the other end of each of the reflective layers 125R and 126R. In more detail, the largest amount of visible light incident into a lower end of each of the first and second guides 125 and 126 may be emitted through an upper end of each of the first and second guides 125 and 126. That is, the emission of the light through side surfaces of the guides 125 and 126 while the visible light proceeds may be maximally prevented.

Light entrances 125E, 125F, and 125G may be provided in the first guide 125. Here, the reflective layer 125R may not be provided on the light entrances 125E, 125F, and 125G. Also, light entrances 126E, 126F, and 126G may be provided in the second guide 126. Here, the reflective layer 126R may not be provided on the light entrances 126E, 126F, and 126G. The light entrances 125E, 125F, 125G, 126E, 126F, and 126G may be formed by cutting portions of the reflective layers 125R and 126R.

Thus, at least one portion of portions of the first and second guides 125 and 126 in which the light entrances 125E, 125F, 125G, 126E, 126F, and 126G are not provided may be surrounded by the reflective layers 125R and 126R. Here, the reflective layers 125R and 126R may cover an area, in which the light entrances 125E, 125F, 125G, 126E, 126F, and 126G are not provided, as widely as possible.

The light entrances of the first guide 125 include a first light entrance 125E defined in a lower end of the first guide part 125A, a second light entrance 125F defined under a point at which the first guide part 125A is in contact with the connection part, and a third light entrance 125G defined in an upper end of the second guide part 125B.

Also, the light entrances of the second guide 126 include a first light entrance 126E defined in a lower end of the first guide part 126A, a second light entrance 126F defined under a point at which the first guide part 126A is in contact with the connection part, and a third light entrance 126G defined in an upper end of the second guide part 126B.

In the first and second guides 125 and 126, the electromagnetic waves for the near-field wireless communication may be introduced into each of the first entrances 125E and 126E from the transmitting device 131 or discharged from each of the first entrances 125E and 126E into the receiving device 132. Thus, the first light entrances 125E and 126E may be spaced apart from each other above the transmitting device 131 or the receiving device 132. In more detail, the first light entrances 125E and 126E may be spaced apart from each other in a directly upward direction. Here, the electromagnetic waves for the near-field wireless communication may be infrared light as described above.

That is, the first light entrance 125E of the first guide 125 may be a portion into which the infrared light emitted from the transmitting device 131 is introduced, and the first light entrance 126E of the second guide 126 may be a portion through which the infrared light is emitted to the receiving device 133.

The second light entrances 125F and 126F may be portions into which the visible light emitted from the first or second LED 121 or 122 is introduced. The second light entrances 125F and 126F may be disposed to be spaced upward from the first or second LED 121 or 122. In more detail, the second light entrances 125F and 126F are disposed to be spaced in a directly upward direction.

The third light entrances 125G and 126G may be portions through the visible light emitted from the first and second LEDs 121 and 122 and the electromagnetic waves (e.g., the infrared light) for the near-field wirelessly communication, which is emitted from the transmitting device 131, to the outside of the charger body 110 and a portion into which the visible light or the electromagnetic waves (e.g., the infrared light) for the near-field wirelessly communication from the communication unit 210 of the external device 20 is introduced.

In more detail, the third light entrance 125G of the first guide 125 may be a portion through which the visible light is emitted from the first LED 121 to the outside or that serves as a passage through which the infrared light is emitted from the transmitting device 131 to the outside. Also, the third light entrance 126G of the second guide 126 may be a portion through which the visible light is emitted from the second LED 122 to the outside or that serves as a passage through which the infrared light is introduced from the external device 20.

The third guide 127 may have a linear shape that extends in a vertical direction. Thus, the third guide 127 may guide only the visible light of the third ED 123.

A reflective layer may also be disposed on the third guide 127. Here, the reflective layer may be omitted on upper and lower ends of the third guide 127. The upper and lower ends of the third guide 127 may be portions through which the visible light is incident or emitted to serve as entrances for light.

Hereinafter, an operation of the charger 10 will be described.

When the first connector 140 is connected to the commercial power source, and the second connector 150 is connected to the electric vehicle to allow charging of the vehicle to start, the control unit 112 may turn the first LED 121 on. Then, the green visible light irradiated from the first LED 121 may be irradiated to the outside of the charger 10 through the second guide part 125C of the first guide 125.

In more detail, the green visible light may be incident into the second guide part 125C through the second light entrance 125F and then emitted to the outside through the third light entrance 125G. In this process, since the emission of the visible light in a lateral direction of the first guide 125 is restricted due to the reflective layer 125R disposed on the first guide 125, the largest amount of light may be emitted through the third light entrance 125G.

Thus, the user may confirm that the charging is in progress through the emission of the green visible light.

When the charging is completed, the control unit 112 may turn the second LED 122 on. Here, the first LED 121 may be turned off. When the second LED 122 is turned on, the yellow visible light irradiated from the second LED 122 may be irradiated to the outside 10 through the second guide part 126C of the second guide 126.

In more detail, the yellow visible light may be incident into the second guide part 126C through the second light entrance 126F of the second guide 126 and then emitted to the outside through the third light entrance 126G. In this process, since the emission of the visible light in a lateral direction of the second guide 126 is restricted due to the reflective layer 126R disposed on the second guide 126, the largest amount of light may be emitted through the third light entrance 126G.

Thus, the user may confirm that the charging is completed due through the emission of the yellow visible light.

During the charging, when the power is supplied from the commercial power source to the electric vehicle, the control unit 112 may turn the third LED 123 on. Thus, the red visible light irradiated from the third LED 123 may be irradiated to the outside of the charger 10 through the third guide 127.

Here, other portions of the third guide 127 except for the upper and lower ends of the third guide 127 may be surrounded by the reflective layer 125R. Thus, the largest amount of light may be emitted to the outside.

Thus, the user may confirm that the supply of the power is blocked through the emission of the yellow visible light.

When the state of the charger 10 is confirmed, or the firmware of the charger 10 is ungraded, the external device 20 may be disposed adjacent to the charger 10 to allow the external device 20 to communicate with the charger 10.

Here, a starting signal for communication may be transmitted from the external device 20 to the charger 10. That is, infrared light for the communication starting may be irradiated from the communication unit 210 of the external device 20.

The infrared light irradiated from the external device 20 may reach the receiving device 132 via the second guide part 126C, the connection part 126B, and the first guide part 126A of the second guide 126.

In more detail, the infrared light may be incident into the second guide part 126C through the third light entrance 126G, and then guided to successively pass through the second guide part 126C, the connection part 126B, and the first guide part 126A. Thereafter, the infrared light may be emitted to the receiving device 132 through the first light entrance 126E.

In this process, since the emission of the visible light in a lateral direction of the second guide 126 is restricted due to the reflective layer 126R disposed on the second guide 126, the largest amount of light may be emitted through the first light entrance 126E.

The transmitting device 131 may transmit the electromagnetic waves (the infrared light) for the near-field wireless communication including the present state information of the charger 10. The electromagnetic waves (the infrared light) for the near-field wireless communication that is transmitted from the transmitting device 131 may reach the external device 20 via the first guide part 125A, the connection part 125B, and the second guide part 125C of the first guide 125.

In more detail, the infrared light may be incident into the first guide part 125A through the first light entrance 125E, and then guided to successively pass through the first guide part 125A, the connection part 125B, and the second guide part 125C. Thereafter, the infrared light may be emitted to the outside of the third light entrance 125G. In this process, since the emission of the visible light in a lateral direction of the second guide 125 is restricted due to the reflective layer 125R disposed on the first guide 125, the most amount of light may be emitted through the third light entrance 125G.

Figure 5:
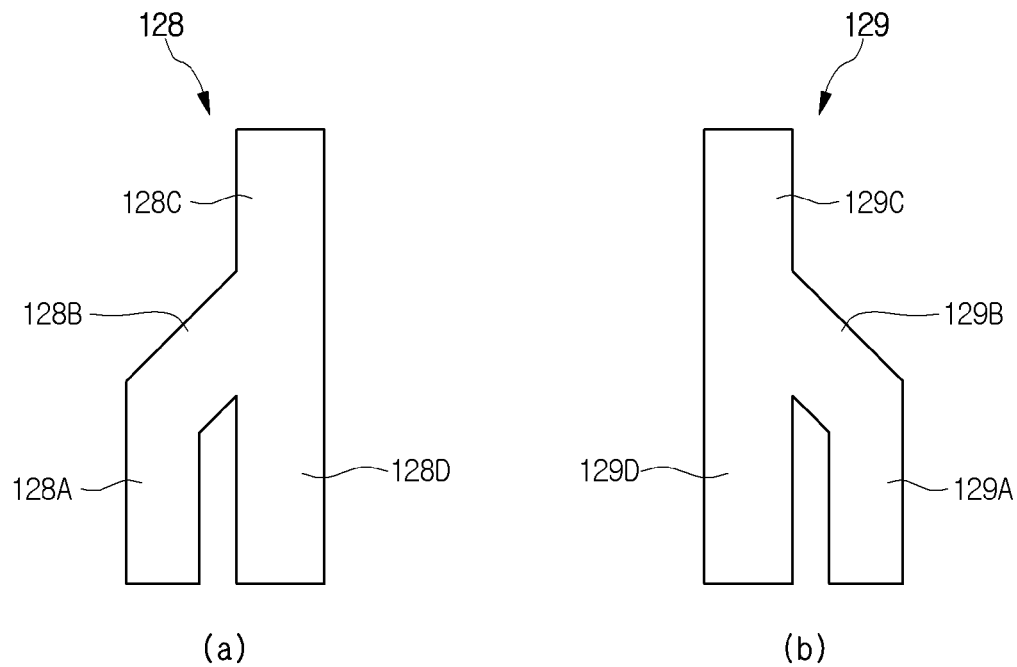
FIG. 5 is a side view illustrating a modified example of the guide, wherein (a) of FIG. 5 is a side view illustrating a modified example of the first guide, and (b) of FIG. 5 is a side illustrating a modified example of the second guide.
Figure 6:
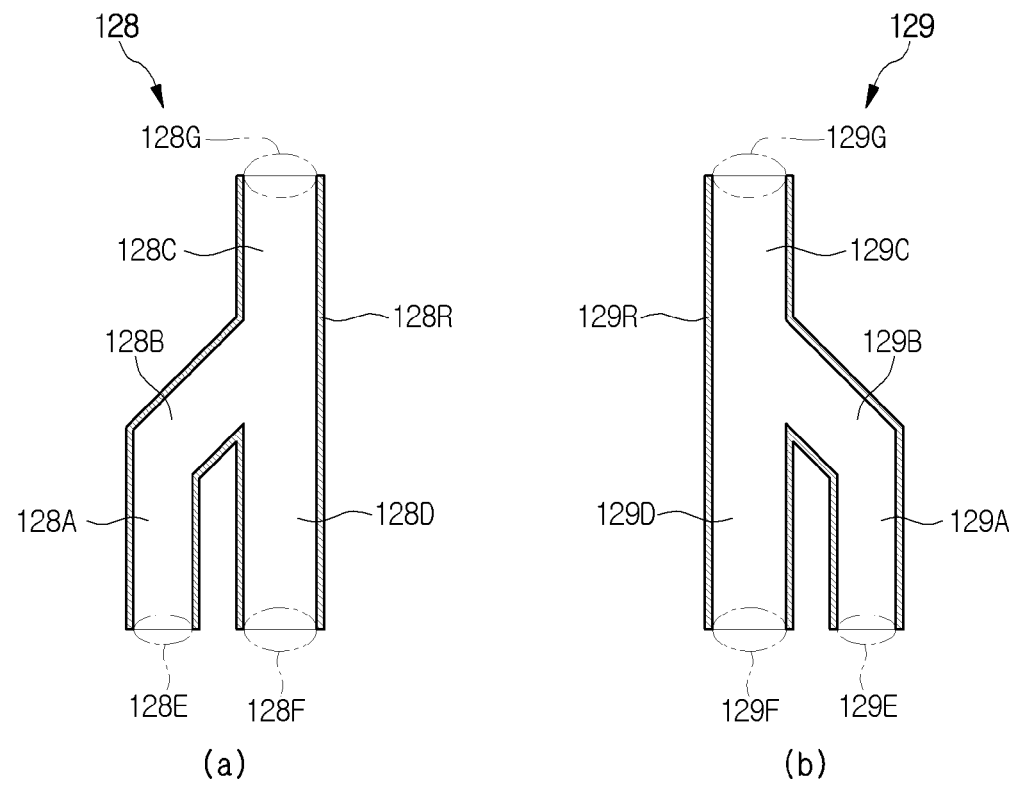
FIG. 6 is a side cross-sectional view illustrating the guide of FIG. 5, wherein (a) of FIG. 6 is a side cross-sectional view illustrating the first guide of (a) of FIG. 5, and (b) of FIG. 6 is a side cross-sectional view illustrating the second guide of (b) of FIG. 5.

Each of the first and second guides 125 and 126 may be provided in a shape as illustrated in FIGS. 5 and 6.

FIG. 5 is a side view illustrating a modified example of the guide, wherein FIG. 5A is a side view illustrating a modified example of the first guide, and FIG. 5B is a side illustrating a modified example of the second guide. Also, FIG. 6 is a side cross-sectional view illustrating the guide of FIG. 5, wherein FIG. 6A is a side cross-sectional view illustrating the first guide of FIG. 5A, and FIG. 6B is a side cross-sectional view illustrating the second guide of FIG. 5B.

A first guide 128 illustrated in FIGS. 5 and 6 may include a first guide part 128A extending vertically, a connection part 128B inclinedly extending upward from the first guide part 128A, and a second guide part 128C vertically extending from the connection part 128B. In more detail, the connection part 128B may inclinedly extend upward from an upper end of the first guide part 128A, and the second guide part 128C may extend upward from an upper end of the connection part 128B.

Also, the first guide 128 may further include a third guide part 128D extending toward an LED of a light emitting unit from one of the first guide part 128A, the connection part 128B, and the second guide part 128C. In more detail, the guide 128 may further include the third guide part 128D extending downward from a lower end of the second guide part 128C.

A second guide 129 illustrated in FIGS. 5 and 6 may include a first guide part 194A extending vertically, a connection part 129B inclinedly extending upward from the first guide part 129A, and a second guide part 129C vertically extending from the connection part 129B. In more detail, the connection part 129B may inclinedly extend upward from an upper end of the first guide part 129A, and the second guide part 129C may extend upward from an upper end of the connection part 129B.

Also, the second guide 129 may further include a third guide part 129D extending toward an LED of a light emitting unit from one of the first guide part 129A, the connection part 129B, and the second guide part 129C. In more detail, the second guide 129 may further include the third guide part 129D extending downward from a lower end of the second guide part 129C.

Also, the first and second guides 128 and 129 may be horizontally symmetrical to each other.

Thus, a lower end of each of the first and second guide parts 128A and 129A may be spaced apart from an upper portion of the transmitting device 131 or the receiving device 132 as described above. Also, a lower end of each of the third guide parts 128D and 129D may be spaced apart from an upper portion of the first or second LED 121 or 122. In more detail, the lower end of each of the first and second guide parts 128A and 129A may be disposed in a directly upward direction of the transmitting device 131 or the receiving device 132, and the lower end of each of the third guide parts 128D an 129D may be disposed in a directly upward direction of the first or second LED 121 or 122.

Here, first light entrances 128E and 129E are disposed on lower ends of the first guide parts 128A and 129A of the first and second guides 128 and 129, respectively. Also, the second light entrances 128F and 129F are respectively disposed on the lower ends of the third guide parts 128D and 129D, and the third light entrances 128G and 129G may be respectively disposed on upper end of the second guide parts 128C and 129C.

Also, reflective layers 128R and 129R may be disposed on at least one portion of the guide parts on which the light entrances 128E, 128F, 128G, 129E, 129F, and 129G are not provided. Also, the reflective layers 128R and 129R may surround maximally wide area of the guide parts on which the light entrances 128E, 128F, 128G, 129E, 129F, and 129G are not provided. The reflective layers 128R and 129R may reflect the visible light to the insides of the guides to prevent the visible light guided to the insides of the guides from being emitted to the outsides of the guides. Thus, the emission of the visible light in the lateral direction of the guide may be restricted in a region in which the light entrances are not provided to maximize light transfer efficiency.

In the first guide 128, the extension direction of the first guide part 128A may be the same as that of the third guide part 128B. Also, in the second guide 129, the extension direction of the first guide part 129A may be the same as that of the third guide part 129D.

Hereinafter, a light transfer path will be described with reference to FIGS. 5 and 6.

The visible light irradiated from the first or second LED 121 or 122 may be irradiated to the outside of the charger 10 through the first and second guides 128 and 129 each of which has the shape as illustrated in FIGS. 5 and 6.

In more detail, the visible light incident into the third guide part 128D through the second light entrances 128F and 129F of the first and second guides 129 and 129 may be successively transferred through the third guide parts 125F and 129F and the second guide parts 128C and 129C and then emitted to the outside through the third light entrances 128G and 129G. In this process, since the emission of the visible light in a lateral direction of the guide 128 is restricted due to the reflective layers 128R and 129R disposed on the first guide 128, the most amount of light may be emitted through the third light entrances 128G and 129G.

The electromagnetic waves (the infrared light) for the near-field wireless communication that is irradiated from the external device 20 may reach the receiving device 132 via the second guide part 129C, the connection part 129B, and the first guide part 129A of the second guide 129.

In more detail, the electromagnetic waves (the infrared light) for the near-field wireless communication may be incident into the second guide part 129C through the third light entrance 129G, and then guided to successively pass through the second guide part 129C, the connection part 129B, and the first guide part 129A. Thereafter, the electromagnetic waves (the infrared light) may be emitted to the receiving device 132 through the first light entrance 129E.

In this process, since the emission of the visible light in a lateral direction of the second guide 129 is restricted due to the reflective layer 129R disposed on the second guide 129, the largest amount of light may be emitted through the first light entrance 129E.

The electromagnetic waves (the infrared light) for the near-field wireless communication that is transmitted from the transmitting device 131 may reach the external device 20 via the first guide part 128A, the connection part 128B, and the second guide part 128C of the first guide 128.

In more detail, the infrared light may be incident into the first guide part 128A through the first light entrance 128E, and then guided to successively pass through the first guide part 128A, the connection part 128B, and the second guide part 125C. Thereafter, the infrared light may be emitted to the outside of the third light entrance 128G. In this process, since the emission of the visible light in a lateral direction of the guide 128 is restricted due to the reflective layer 128R disposed on the first guide 128, the most amount of light may be emitted through the third light entrance 128G.

According to the foregoing embodiment, the charger 10 may transmit the present state information by using the transmitting device 131 to perform a diagnosis of the charger 10 through the external device 20.

Also, since the charger 10 may receive the information for upgrading the firmware from the external device 20 by using the receiving device 132, the firmware upgrading of the charger 10 may be enabled.

Also, since the charger body 110 may communicate with the external device 20 through the near-field wireless communication such as the infrared-light communication without exposing a separate port to the outside of the body 110, an additional constitution for securing the waterproof performance of the charger body 110 may be unnecessary, and access for the communication of a malicious user may be impossible because the port is not exposed to the outside.

Also, since the guide for guiding the visible light of the light emitting unit may guide the electromagnetic waves for the near-field wireless communication such as the infrared light, an additional guide for guiding the infrared light may be unnecessary.

Also, the reflective layers 125R and 128R may be provided to improve the light transfer efficiency. In addition, the light entrances may be provided to prevent the movement of the visible light from being restricted by the reflective layers 125R and 128R.

Also, when the third guide part 128D is further provided, since the lower end of the guide part 128 is disposed at a point that is adjacent to the LEDs constituting the light emitting unit, the more amount of light may be guided through the guide 128, thereby more improving the light transfer efficiency.

According to the proposed embodiment, since the charger communicates with the external device through the infrared light, the charger may be diagnosed through the external device. In addition, the charger may receive the information for upgrading the firmware from the external device so as to upgrade the firmware of the charger.

Also, since the charger body communicates with the external device 20 through the near-field wireless communication such as the infrared-light communication without exposing a separate port to the outside of the body, an additional constitution for securing the waterproof performance of the charger may be unnecessary, and the access for the communication of the malicious user may be impossible because the port is not exposed to the outside.

Also, since the guide for guiding the visible light of the light emitting unit may guide the infrared light, an additional guide for guiding the infrared light may be unnecessary.

Also, since the guide includes the reflective layers that surround the outside thereof, the light transfer efficiency may be improved.

Also, since the reflective layers are not provided on the light entrances, the infrared light that is used for the near-field wireless communication or the visible light that is emitted from the light emitting unit may not be restricted in movement to improve the light transfer efficiency.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charger for an electric vehicle, the charger comprising:
   a light emitting unit emitting visible light and displaying charging operation information of the charger;
   a communication unit performing near-field wireless communication with an external device;
   a guide guiding the visible light emitted by the light emitting unit; and
   a control unit controlling operations of the light emitting unit and the communication unit,
   wherein the communication unit comprises a transmitting device transmitting electromagnetic waves for the near-field wireless communication and a receiving device receiving electromagnetic waves for the near-field wireless communication,
   wherein the guide guides the electromagnetic waves for the near-field wireless communication that are emitted from the transmitting device of the communication unit or received by the receiving device of the communication unit,
   wherein the guide comprises:
     a reflective layer surrounding an external portion of the guide and reflecting the emitted visible light toward an inside portion of the guide;
     a first guide part that extends vertically and has a lower end that is located above the transmitting device or receiving device of the communication unit;
     a connection part that extends and is inclined upward from an upper end of the first guide part;
     a second guide part that is located above the light emitting unit and extends upward from the connection part;
     a first light entrance provided in a lower portion of the first guide part;
     a second light entrance provided in a lower portion of the second guide part; and
     a third light entrance provided in an upper portion of the second guide part,
   wherein the reflective layer of the guide is not provided on the first light entrance, the second light entrance or the third light entrance.

2. The charger according to claim 1, wherein:
   either the electromagnetic waves for the near-field wireless communication are received from the transmitting device through the first light entrance, or the or the visible light is emitted onto the receiving device through the first light entrance;
   the emitted visible light is received through the second light entrance; and
   either the electromagnetic waves for the near-field wireless communication or the emitted visible light is emitted through the third light entrance or external infrared light is received through the third light entrance.

3. A charger for an electric vehicle, the charger comprising:
- a light emitting unit emitting visible light and displaying charging operation information of the charger;
- a communication unit performing near-field wireless communication with an external device;
- a guide guiding the visible light emitted by the light emitting unit; and
- a control unit controlling operations of the light emitting unit and the communication unit,
- wherein the communication unit comprises a transmitting device transmitting electromagnetic waves for the near-field wireless communication and a receiving device receiving electromagnetic waves for the near-field wireless communication,
- wherein the guide guides the electromagnetic waves for the near-field wireless communication that are emitted from the transmitting device of the communication unit or received by the receiving device of the communication unit,
- wherein the guide comprises:
  - a reflective layer surrounding an external portion of the guide and reflecting the emitted visible light toward an inside portion of the guide;
  - a first guide part that extends vertically and has a lower end that is located above the transmitting device or receiving device of the communication unit;
  - a connection part that extends and is inclined upward from an upper end of the first guide part;
  - a second guide part that that is located above the light emitting unit and extends upward from the connection part; and
  - a third guide part extending toward the light emitting unit from the first guide part, the connection part or the second guide part.

4. The charger according to claim 3, wherein the first guide part extends in a same direction as the third guide part.

5. The charger according to claim 3, wherein:
- a lower portion of the first guide part comprises a first light entrance through which the electromagnetic waves for the near-field wireless communication are received from the transmitting device of the communication unit or are emitted to the receiving device of the communication unit;
- a lower portion of the third guide part comprises a second light entrance through which the emitted visible light is received;
- an upper portion of the second guide part comprises a third light entrance through which either the electromagnetic waves for the near-field wireless communication or the emitted visible light is emitted or external infrared light is received; and
- the reflective layer of the guide is not provided on the first light entrance, the second light entrance or the third light entrance.

6. The charger according to claim 1, wherein the electromagnetic waves comprise infrared light.

7. The charger according to claim 1, wherein the first and second guide parts extend such that they are offset from each other.

8. The charger according to claim 1, wherein the guide further comprises:
- a first guide guiding electromagnetic waves transmitted by the transmitting device of the communication unit; and
- a second guide guiding electromagnetic waves received by the receiving device of the communication unit,
- wherein a connection part of the first guide and a connection part of the second guide are separated from each other in an upward direction.

9. The charger according to claim 1, wherein:
- the light emitting unit comprises a first light emitting part and a second light emitting part that are spaced apart from each other; and
- the transmitting device and the receiving device of the communication unit are located between the first light emitting part and the second light emitting part.

* * * * *